(12) United States Patent
Hargreaves et al.

(10) Patent No.: US 8,607,324 B2
(45) Date of Patent: Dec. 10, 2013

(54) UNTRUSTED GAMING SYSTEM ACCESS TO ONLINE GAMING SERVICE

(75) Inventors: Shawn Hargreaves, Redmond, WA (US); John Mitchell Walker, Duvall, WA (US); Richard A. Meyer, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1363 days.

(21) Appl. No.: 12/014,680

(22) Filed: Jan. 15, 2008

(65) Prior Publication Data

US 2009/0181772 A1 Jul. 16, 2009

(51) Int. Cl.
*G06F 9/00* (2006.01)

(52) U.S. Cl.
USPC ............... 726/12; 726/2; 713/153; 713/155; 713/161; 713/176; 463/29; 463/42

(58) Field of Classification Search
USPC ............. 726/2, 12; 713/153, 155, 161, 176; 463/29, 42
See application file for complete search history.

(56) References Cited

U.S. PATENT DOCUMENTS

| | | | |
|---|---|---|---|
| 5,649,099 A | 7/1997 | Theimer | 395/187.01 |
| 6,085,233 A * | 7/2000 | Jeffrey et al. | 709/216 |
| 6,185,535 B1 * | 2/2001 | Hedin et al. | 704/270 |
| 6,275,938 B1 | 8/2001 | Bond | 713/200 |
| 6,505,300 B2 | 1/2003 | Chan | 713/164 |
| 2002/0188649 A1 | 12/2002 | Karim | 718/102 |
| 2005/0223239 A1 | 10/2005 | Dotan | 713/154 |
| 2006/0137007 A1 | 6/2006 | Paatero | 726/22 |
| 2007/0076727 A1 * | 4/2007 | Shei | 370/401 |
| 2007/0083932 A1 | 4/2007 | Aniszczyk | 726/25 |
| 2007/0186093 A1 * | 8/2007 | Tighe et al. | 713/151 |
| 2007/0189196 A1 * | 8/2007 | Miller et al. | 370/315 |
| 2009/0113216 A1 * | 4/2009 | Chen et al. | 713/189 |

OTHER PUBLICATIONS

"Access Control," Java In A Nutshell, http://www.unix.org.us/orelly/jave-ent/jnut/ch05_04.htm, downloaded 2007, 1-4.
"Security Considerations," Sun Microsystems Inc., http://www.java.sun.com/j2se/1.4.2/docs/guide/jndi/spec/jndi/jndi.8.html, downloaded 2007, 1-4.

* cited by examiner

*Primary Examiner* — Tae Kim
*Assistant Examiner* — Joseph Pan
(74) *Attorney, Agent, or Firm* — Woodcock Washburn, LLP

(57) ABSTRACT

Systems, methods and computer readable media are disclosed for a trusted proxy to intercept communications between an untrusted computerized gaming system and an online multi-player gaming service that requires games to be trusted, allowing the untrusted computerized gaming system to use the multi-player gaming service. In addition to allowing the untrusted computerized gaming system to use the multi-player gaming service in general, the trusted proxy can also limit the extent of the interaction between the untrusted computerized gaming system and the multi-player gaming service.

20 Claims, 16 Drawing Sheets

UNTRUSTED GAMING SYSTEM ACCESS TO ONLINE GAMING SERVICE

BACKGROUND OF THE INVENTION

In recent years, online multi-player services for video games have exploded in popularity. For example, the popular XBOX LIVE® service made available by Microsoft Corporation of Redmond, Wash. allows gamers anywhere in the world to play with and against each other. Other online multi-player services presently include the PLAYSTATION NETWORK® service made available by Sony Corporation of America of Inglewood, Calif. and the WIICONNECT24® service made available by Nintendo of America Corporation of Redmond, Wash.

Allowing untrusted games to connect to such services has been a problem because it is extremely difficult to prevent cheating and denial-of-service attacks on the part of the users of the untrusted games, as well as prevent those untrusted games from access to special features of the service for which being trusted is a necessity. As a result, many online multi-player services have required that all games that connect to it be trusted. This in turn presents problems because the process of validating games as trusted is costly, so many smaller games are excluded from participation. Users would still like to play these smaller games via an online multi-player gaming service. Hence, there is a need to allow an untrusted computerized gaming system to use an online multi-player gaming service that requires games to be trusted.

SUMMARY OF THE INVENTION

In an example embodiment of the present disclosure, a method is provided to establish communication between an online multi-player gaming service and a trusted proxy, which is trusted by the online multi-player gaming service to exist in a known, verified state. The primary purposes of requiring the trusted proxy to be trusted are to prevent modification of the proxy for the purpose of cheating involving the service (e.g. tampering with leader-boards or skill rankings), for the purpose of executing denial-of-service attacks, and for the purpose of accessing otherwise unaccessible features of the service (e.g. "achievements"). This being established, the trusted proxy is able to establish communication with an untrusted game, and act as an intermediary between both the online multi-player gaming service and the untrusted game. By doing so, the untrusted game may interact with the online multi-player gaming service whereas it would be unable to do so in the absence of the trusted proxy. In one embodiment, use of the trusted proxy does not guarantee that there will not be cheating in a game-specific scenario (e.g. one that occurs between users rather than one that involves the server directly, such as cheating to alter a leader-board ranking). This method includes, but is not limited to, launching a trusted proxy, initializing, by said trusted proxy, a first communication link with the untrusted game, initializing, by said trusted proxy, a second communication link with the online multi-player gaming service, receiving, by said trusted proxy, a first data on said first communication link, generating, by said trusted proxy, modified data from said first data, wherein the modified data conforms to a format used by the online multi-player gaming service, and passing, by said trusted proxy, said modified data to said online multi-player gaming service.

In another example embodiment of the present disclosure, a system that is capable of performing a function equivalent to that of the above method includes, but is not limited to, a processor, a computer readable medium having a first stored instructions executable by said processor, said first instructions configured to cause said processor to exchange game information with an online multi-player gaming service, and the computer readable medium having a second stored instructions further launching a trusted proxy configured to intercept first data transferred between the untrusted game and the online multi-player gaming service. In addition to the foregoing, other aspects are described in the claims, drawings, and text forming a part of the present disclosure.

In another embodiment of the present disclosure, a computer readable storage medium having a plurality of instructions stored thereon is provided, which, when executed by a processor associated with a system containing stored files within a storage device associated with a receiving portal, command executor and rights verifier, cause the processor to perform the steps of, but is not limited to performing the steps of: executing a trusted proxy process configured to coordinate data transferred between an untrusted process and an online multi-user service, enabling a communication link with the untrusted process, enabling a communication link with the online multi-user service, receiving, from the untrusted process, via a signaling channel a signal indicating that said data is to be read from a shared memory resource, reading said data from said memory resource, and sending said data to the online multi-user service. In addition to the foregoing, other system aspects are described in the claims, drawings, and text forming a part of the present application.

The foregoing is a summary and thus contains, by necessity, simplifications, generalizations and omissions of detail. Those skilled in the art will appreciate that the summary is illustrative only and is not intended to be in any way limiting.

BRIEF DESCRIPTION OF THE DRAWINGS

The systems, methods, and computer readable media for untrusted gaming access to an online gaming service in accordance with this specification are further described with reference to the accompanying drawings in which.

DETAILED DESCRIPTION OF ILLUSTRATIVE EMBODIMENTS

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

Figure 14:
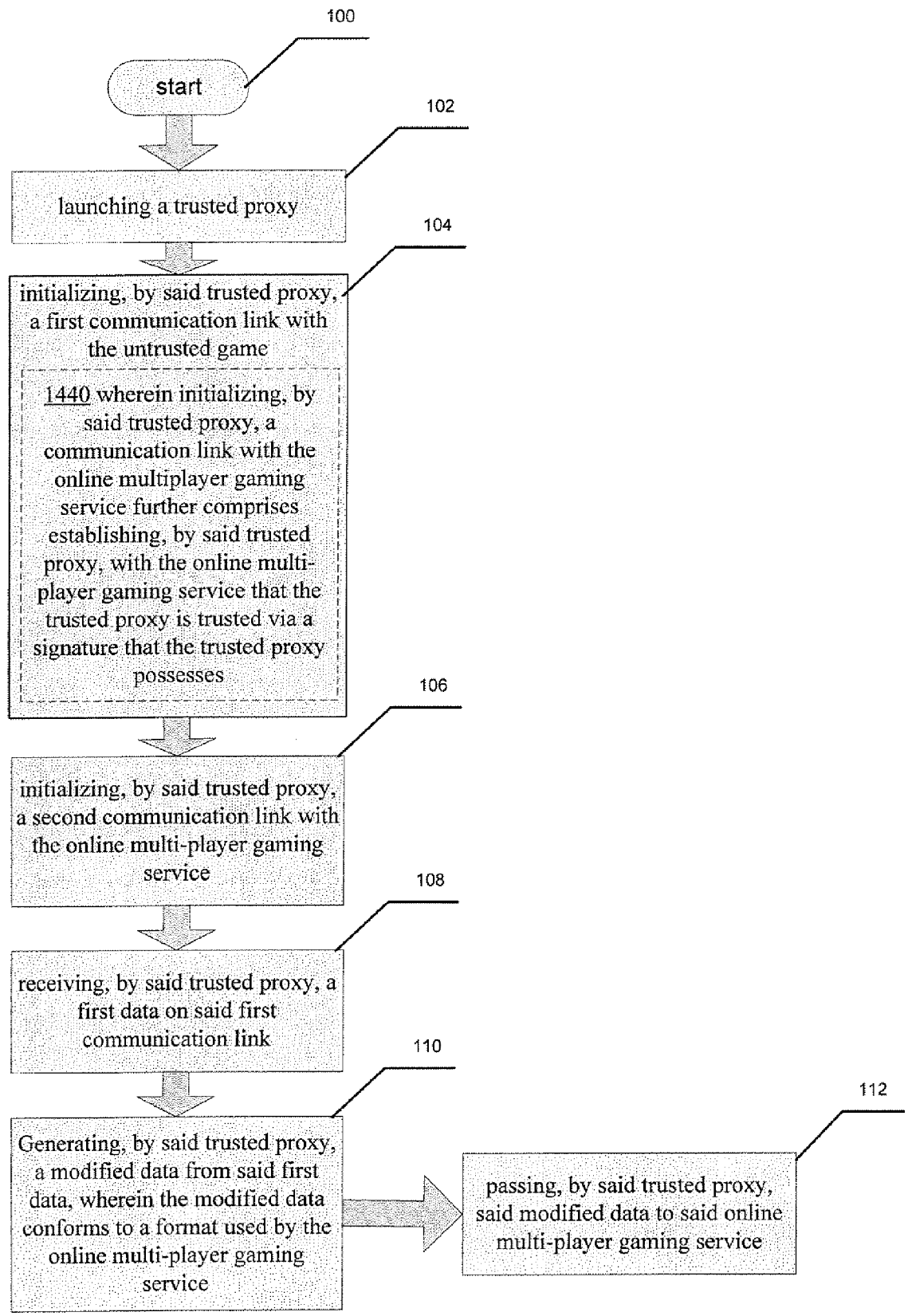
FIG. 14 illustrates an alternative embodiment of the example operational procedure of FIG. 1.
Figure 15:
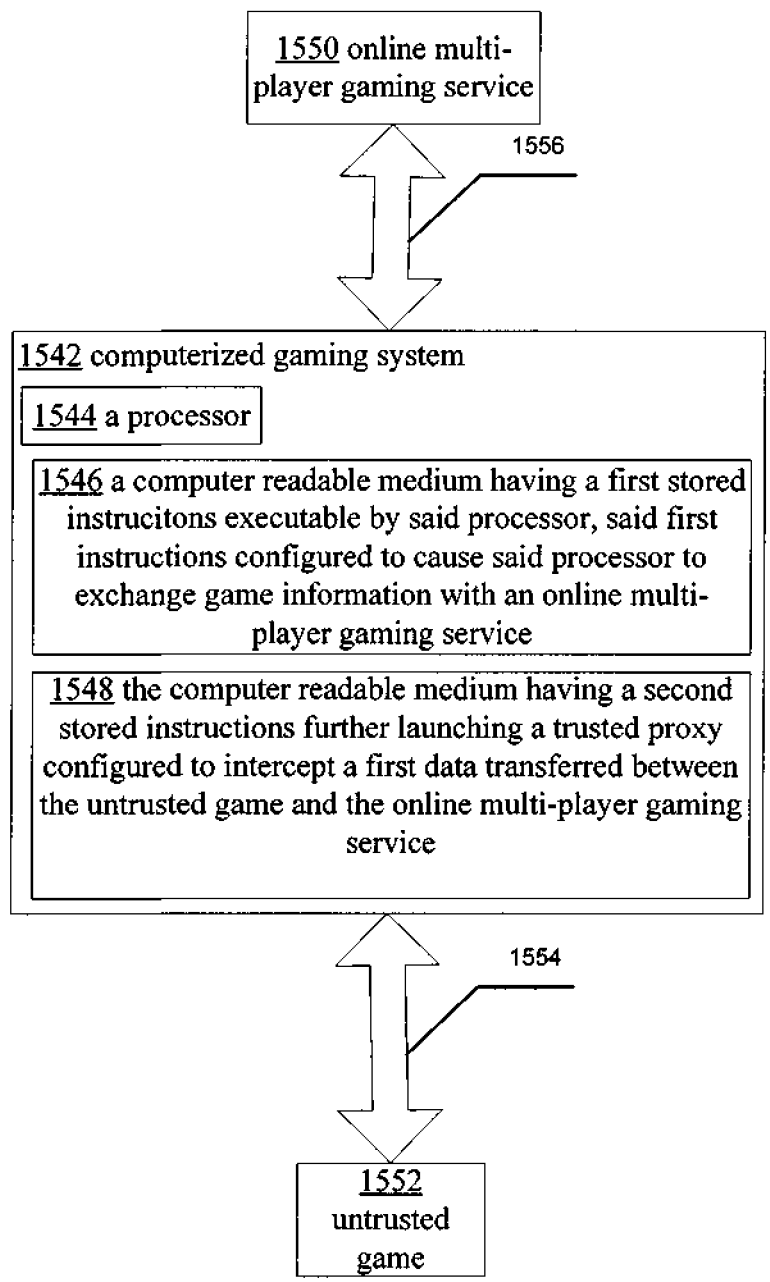
FIG. 15 illustrates an example system for allowing an untrusted game to use an online multi-player gaming service that requires games to be trusted.
Figure 16:
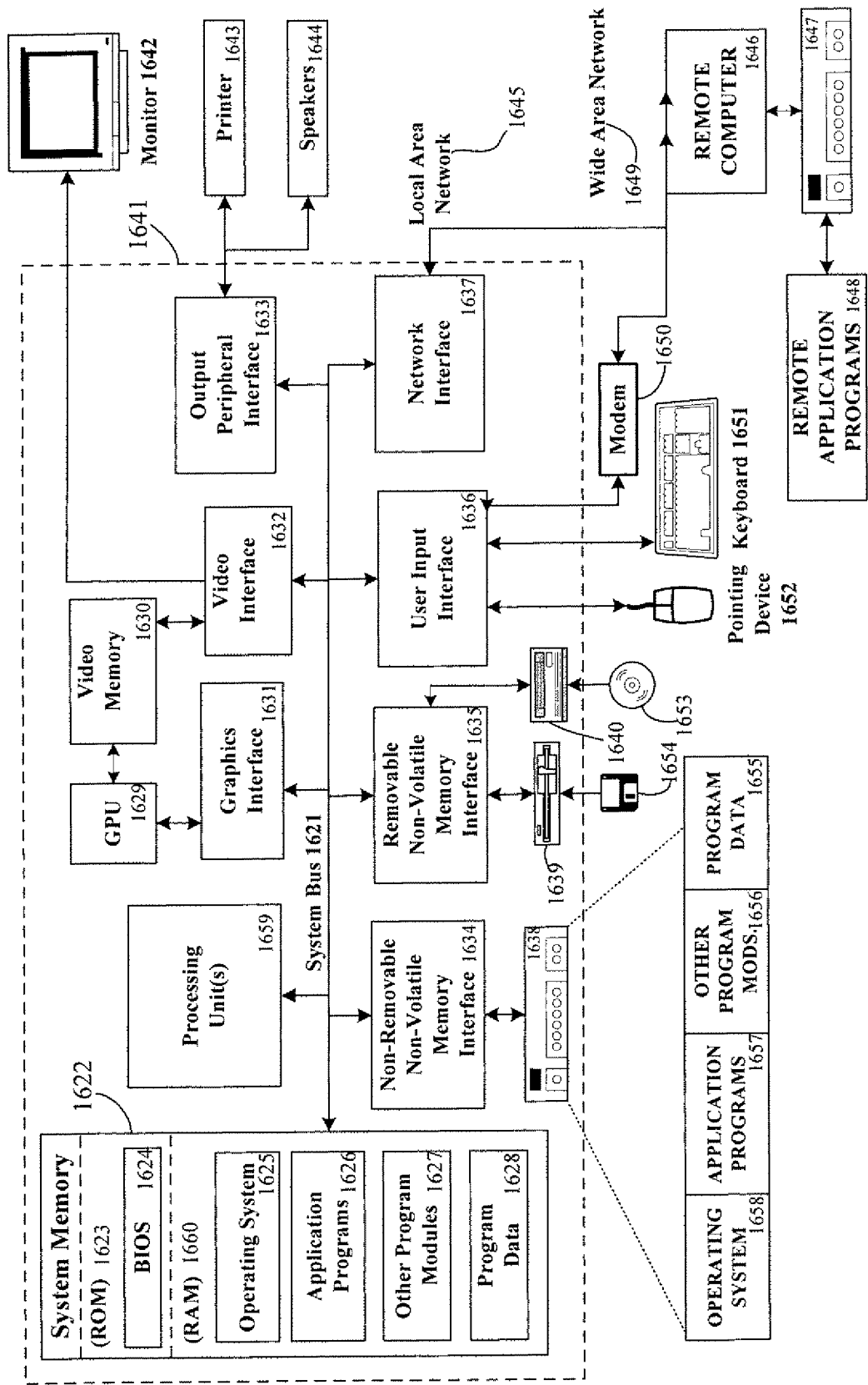
FIG. 16 illustrates an example system for allowing an untrusted game to use an online multi-player gaming service that requires games to be trusted.

FIG. 1 through FIG. 14 provide operational procedures as may be performed in accordance with various embodiments of the invention, while FIGS. 15 and 16 illustrate exemplary systems that may perform such operational procedures.

Figure 1:
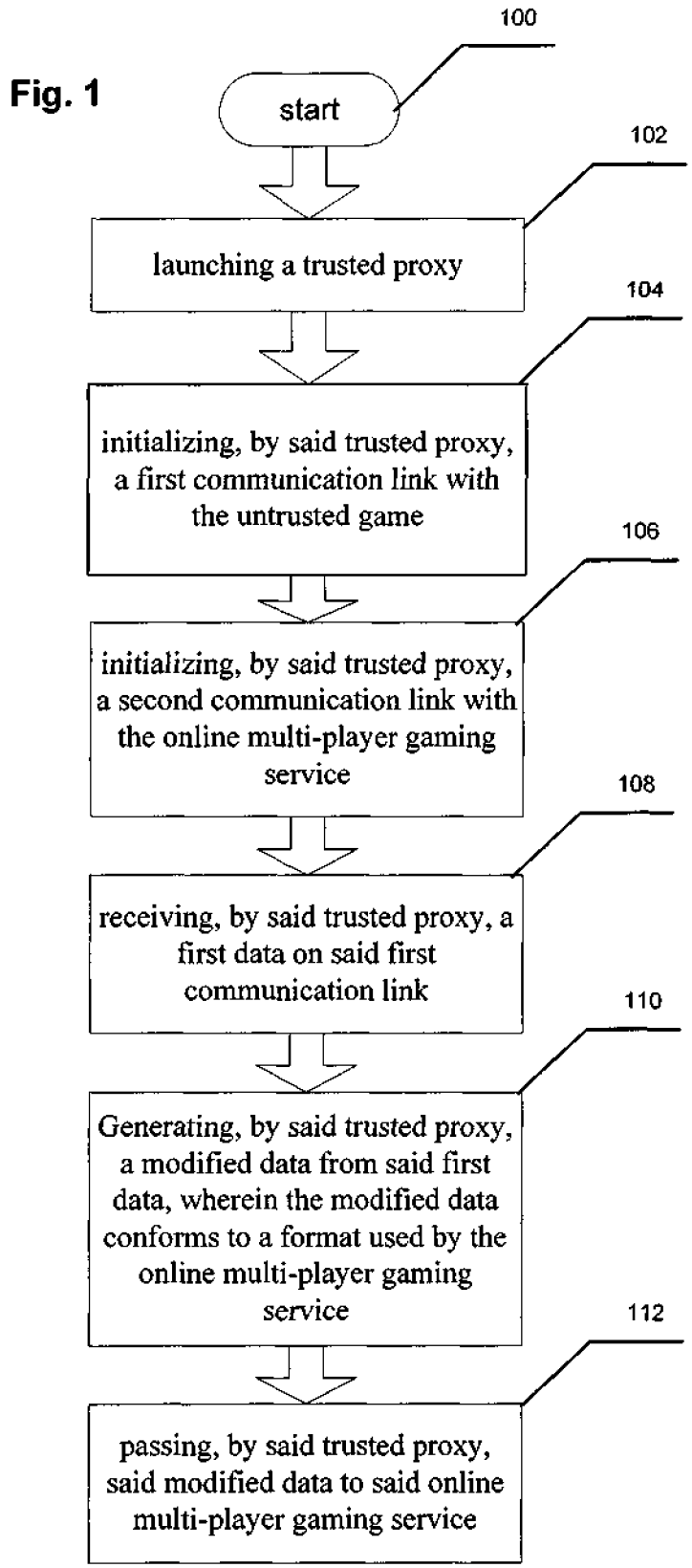
FIG. 1 illustrates an example operational procedure representing operations related to allowing an untrusted game to use an online multi-player gaming service that requires games to be trusted.

FIG. 1 illustrates an example operational flow comprising operations 100-112 related to allowing an untrusted game to use an online multi-player gaming service that requires games to be trusted. Those skilled in the art will note that operations 100-112 are illustrative in purpose and that different implementations can select appropriate operation(s) for such implementations.

Operation 100 begins the operational process Operation 100 can be triggered for example in response to a determination that (1) a connection to an online gaming service is requested, and (2) the game making the request is not trusted.

A game may attempt to connect to an online multi-player gaming services for a variety of reasons. Chief among them is for the purpose of interacting in the game between multiple players, such as two people in different locations each using a gaming system to connect to the online multi-player gaming service for the purpose of playing the same game against each other. Furthermore, once connected, the environment may be used as a communications device, either via text, audio or video and in real time or asynchronously.

In the present context, "trusted" refers to a system or set of computer readable instructions, which contains some form of meta-data (possibly a check-sum) that attests to the fact that the computer readable instructions have not been modified since the meta-data has been added to them. The trusting object (here, the online-multi-player gaming service) can then be sure that the trusted computer readable instructions exist exactly as they did when the meta-data was added to them. Given that, a game may be considered "untrusted" when it does not qualify as trusted, for instance, if it lacks the aforementioned meta-data indicative of being trusted.

Operation 102 depicts launching a trusted proxy. Within an operational environment such as those depicted in FIG. 15 or FIG. 16, a processor 1544 within a computerized gaming system 1542 may execute first stored instructions on a computer readable medium configured to launch a trusted proxy 1548. In some example embodiments of the present disclosure, the processor 1544 may include, but is not limited to, a general purpose microprocessor.

A trusted proxy, when loaded, acts as an intermediary between untrusted games and online gaming services. The trusted proxy could be "trusted" according to the meta-data techniques discussed above, or according to a variety of other techniques recognizable to one skilled in the art. The trusted proxy could exist on the same computing device as the untrusted game, as the online multi-player server, or on a computing device independent of either of those two devices.

As depicted by FIG. 1, operation 104 illustrates initializing, by said trusted proxy, a first communication link with the untrusted game. Within an operational environment such as the one as depicted in FIG. 15 or FIG. 16, a processor 1544 within a computerized gaming system 1542 may initialize with the untrusted game 1552 a first communication link 1554. Initializing a communication link may involve, but is not limited to, the trusted proxy and the untrusted game exchanging a data that establishes things such as the protocol to be used, the respective network ports to be used for the communication link, and the respective network addresses (such as internet protocol (IP) addresses) that the trusted proxy and the untrusted game each possess.

In some example embodiments of the present disclosure, wherein both the trusted proxy and the untrusted game are executing on the same computing environment, the communication link 1554 may include, but is not limited to, an inter-process communication (IPC) link. In another embodiment, the communication link may include, but is not limited to a network communications link, such as one that communicates via the transmission control protocol/internet protocol (TCP/IP).

In one embodiment, the untrusted game would lack notice that it was dealing with the trusted proxy and behave as if it was communicating directly with the online multi-player gaming service. In another embodiment, the untrusted game would have notice that it was dealing with the trusted proxy and behave in accordance with that notice.

As depicted by FIG. 1, operation 106 illustrates initializing, by said trusted proxy, a second communication link with the online multi-player gaming service. Within an operational environment such as the one as depicted in FIG. 15 or FIG. 16, a processor 1544 within a computerized gaming system 1542 may initialize with the service 1552 a second communication link 1556. In some example embodiments of the present disclosure, the communication link 1556 may include, but is not limited to, a transmission control protocol/internet protocol (TCP/IP) communication link. Initializing a communication link may involve, but is not limited to, the trusted proxy and the online multi-player gaming service exchanging a data that establishes things such as the protocol to be used, the respective network ports to be used for the communication link, and the respective network addresses (such as internet protocol (IP) addresses) that the trusted proxy and the untrusted game each possess.

In one embodiment, the online multi-player gaming service would lack notice that it was dealing with the trusted proxy and behave as if it was communicating directly with the online multi-player gaming service. In another embodiment, the online multi-player gaming service would have notice that it was dealing with the trusted proxy and behave in accordance with that notice.

As depicted by FIG. 1, operation 108 illustrates receiving, by said trusted proxy, a first data on said first communication link. In one embodiment of the present disclosure, the first data may comprise a single data packet. In other embodiments, the first data may comprise a stream of data packets. Furthermore, for example, the first data may comprise a representation of game data that the untrusted game wishes to share with the server. For example, if the untrusted game is involved in a multi-player battle-type game, it may wish to share data indicating player actions such as movement, shooting and jumping.

As depicted by FIG. 1, operation 110 illustrates generating, by said trusted proxy, modified data from said first data, wherein the modified data conforms to a format used by the online multi-player gaming service. In one embodiment of the present disclosure, this act of generating a modified data may comprise manipulating said first data by stripping it of identifying information of the first game and replacing said information with information that identifies the modified data as originating from the trusted proxy. In this example, such stripping would aid in accomplishing the goal of hiding from the service (when the data is passed to it) that the data truly originates from the untrusted game, with which the service does not want to communicate, and instead convince the service that the modified data originates from the trusted proxy, with which the service is willing to communicate.

As depicted by FIG. 1, operation 112 illustrates passing, by said trusted proxy, said modified data to said online multi-player gaming service. This is done across said second communication link 1556. In one embodiment of the present disclosure, the modified data may comprise a single data packet. In other embodiments, the modified data may comprise a stream of data packets.

FIG. 2 through FIG. 14 provide additional embodiments of the operation 100. One skilled in the art will recognize that the operational procedures illustrated in FIG. 2 through FIG. 14 are examples and other embodiments exist. Those skilled in the art will note that some operations in FIG. 2 through FIG. 14 are indicated by dashed lines, which in general, indicates that they are to be considered optional. More specifically, different implementations will typically employ one or more herein-described operations dependent upon context, and the selection of the appropriate operation(s) appropriate to the various context(s) is within the skill of one in the art in light of the teachings herein.

Figure 2:
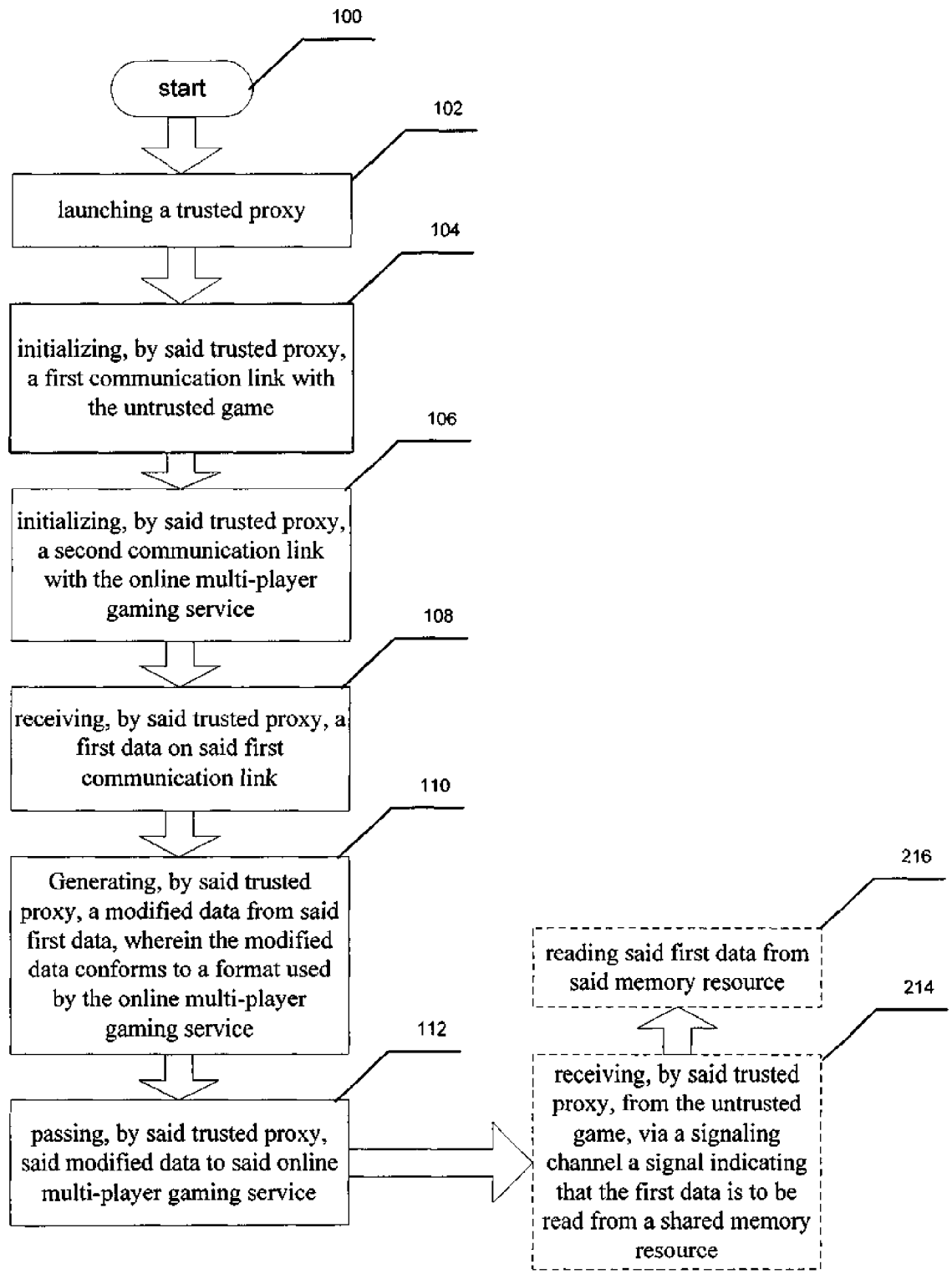
FIG. 2 illustrates an alternative embodiment of the example operational procedure of FIG. 1.

FIG. 2 illustrates an example of the operational procedure 100 including two additional operations. As depicted by operation 214 of FIG. 2, the operational procedure 100 may include receiving, by said trusted proxy, from the untrusted game, via a signaling channel a signal indicating that the first data is to be read from a shared memory resource. Furthermore, as depicted by operation 216 of FIG. 2, the operational procedure 100 may also include reading said first data from said memory resource. In an embodiment of the present disclosure, the memory resource may be, but is not limited to, random access memory, L2 or L3 cache, and a magnetic hard disk. Furthermore, the signaling channel may be, but is not limited to, message passing, a semaphore, a pipe or a socket. The signal itself may be any form of data properly passed in accordance with the requirements of the implementation of the signaling channel.

Figure 3:
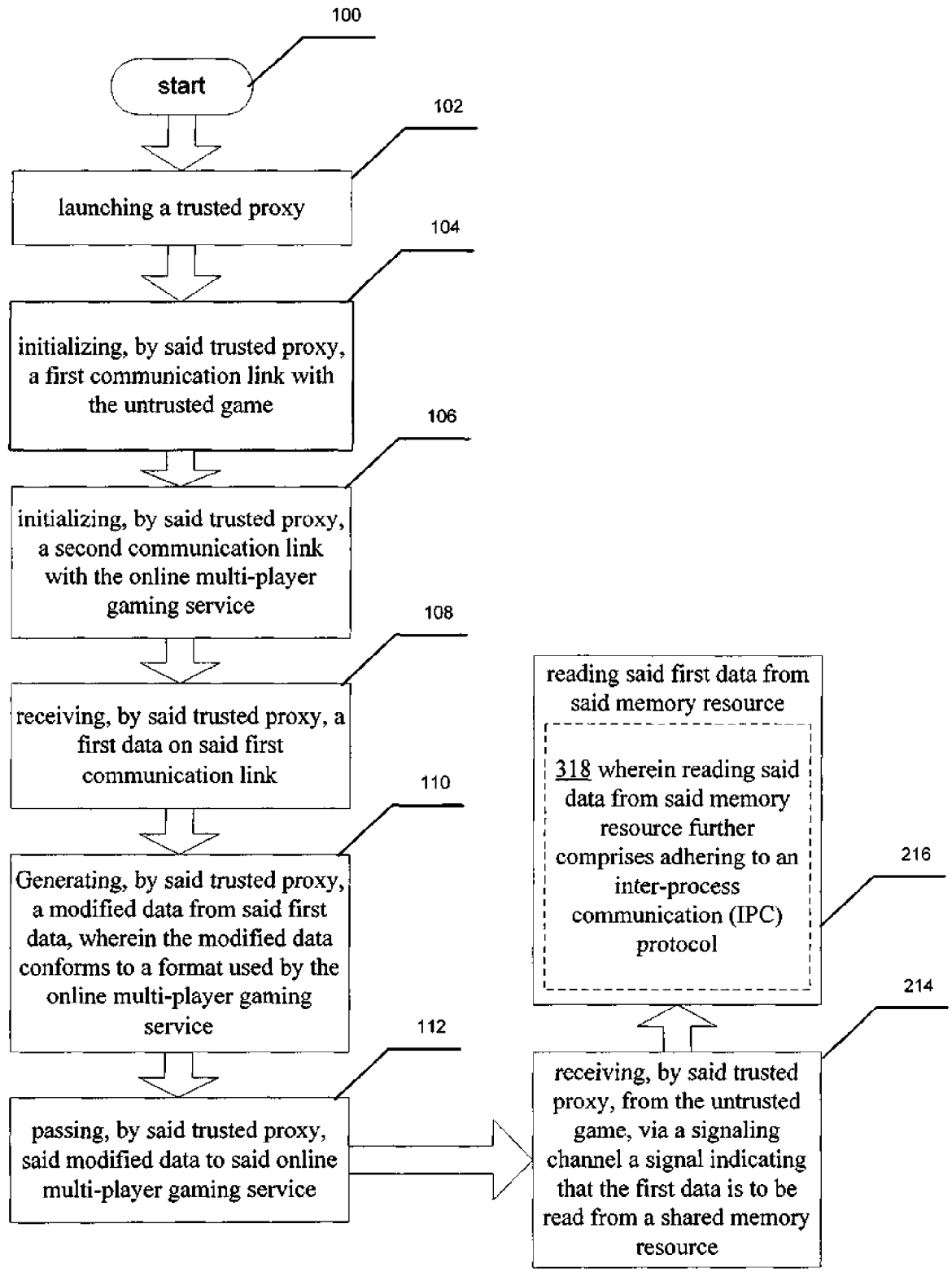
FIG. 3 illustrates an alternative embodiment of the example operational procedure of FIG. 2.

FIG. 3 illustrates an example of the operational procedure 100 including an alternative operation including 318. In this example, reading said first data from said memory resource includes adhering to an inter-process communication (IPC) protocol. In an embodiment of the present disclosure, the inter-process communication protocol may be, but is not limited to, anonymous pipes, named pipes, common object request broker architecture (COBRA), message bus (MBUS), sockets, and remote procedure call (RPC).

Figure 4:
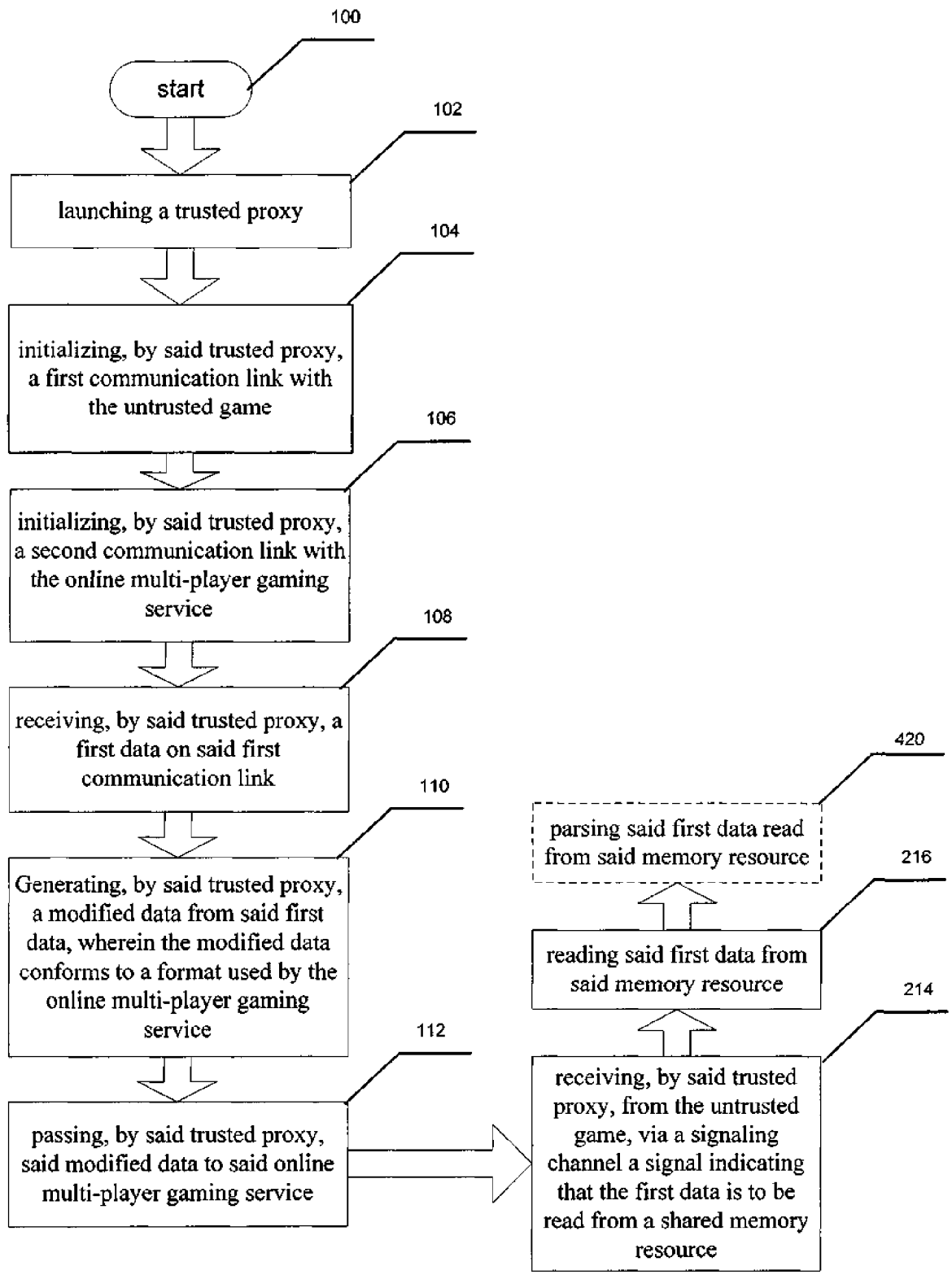
FIG. 4 illustrates an alternative embodiment of the example operational procedure of FIG. 2.

FIG. 4 illustrates an example of the operational procedure 100 that includes an additional operation 420 that illustrates parsing said first data read from said memory resource. In an embodiment of the present disclosure, the parsing step may be performed by, but is not limited to, using regular expressions to divide the first data into its identifiable components, then comparing each identifiable component against a set of known values that correspond to actions to be taken for each identifiable component. In an embodiment of the present invention, discrete parts of the first data that can be parsed include, but are not limited to, the source address of the first data, the destination address of the data, a payload of the first data representing a sub-data to be operated on, a command to be executed, and a check-sum of the first data, which can be used to determine whether the first data has become malformed during transit.

Figure 5:
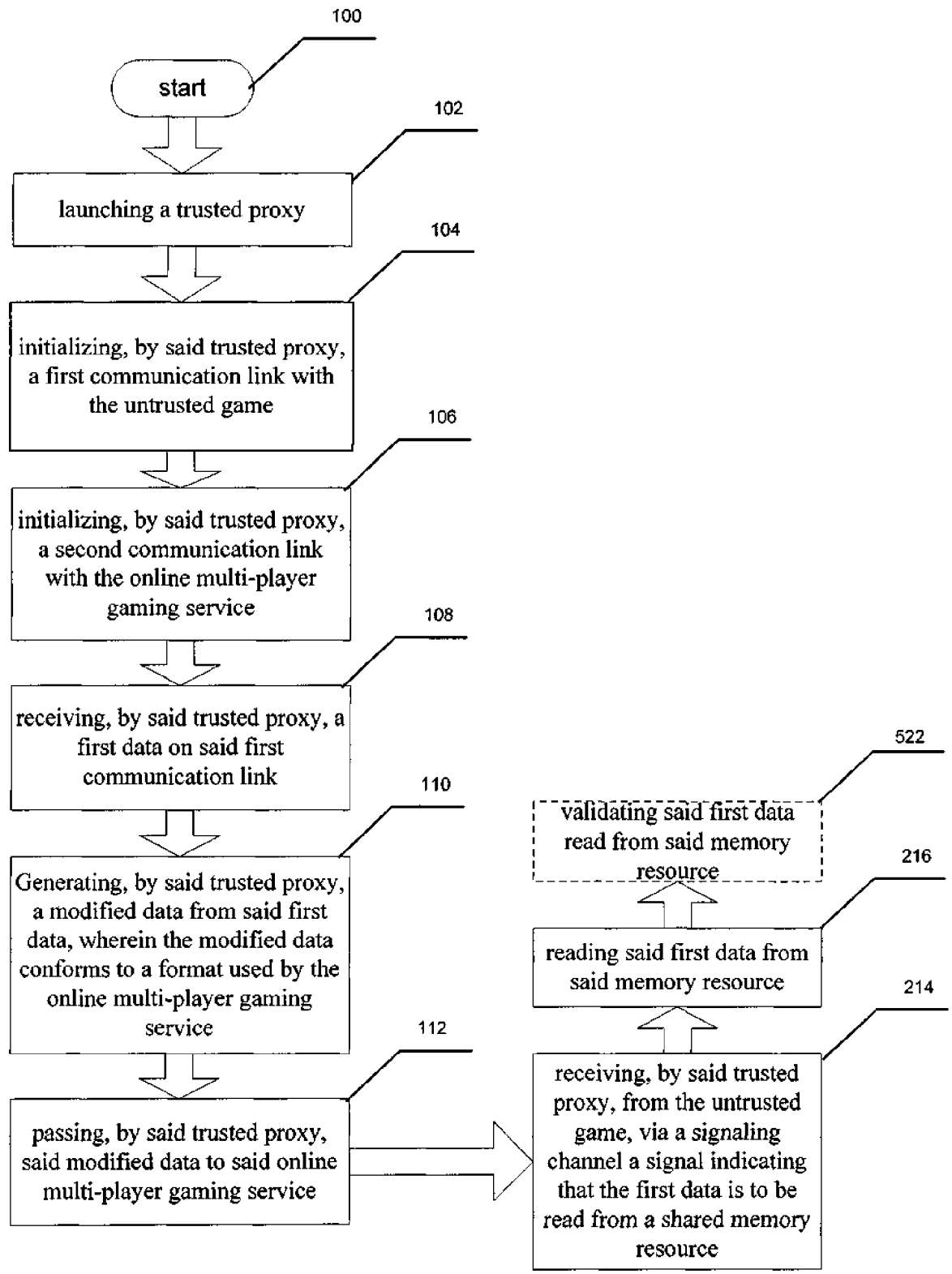
FIG. 5 illustrates an alternative embodiment of the example operational procedure of FIG. 2.

FIG. 5 illustrates an example of the operational procedure 100 that includes an additional operation 522 that illustrates validating said first data read from said memory resource. In an embodiment of the present disclosure, the validating step may be, but is not limited to, comparing the known value of each identifiable component against a table containing acceptable actions that may be performed. Where the first data contains a check-sum, the validating may comprise using the check-sum to verify that the first data has not been malformed during transit. Other steps in the validation process include, but are not limited to, ensuring that the operation requested is one that the untrusted game is permitted to do and checking whether the stated source address of the first data corresponds to the actual source address of the first data.

Figure 6:
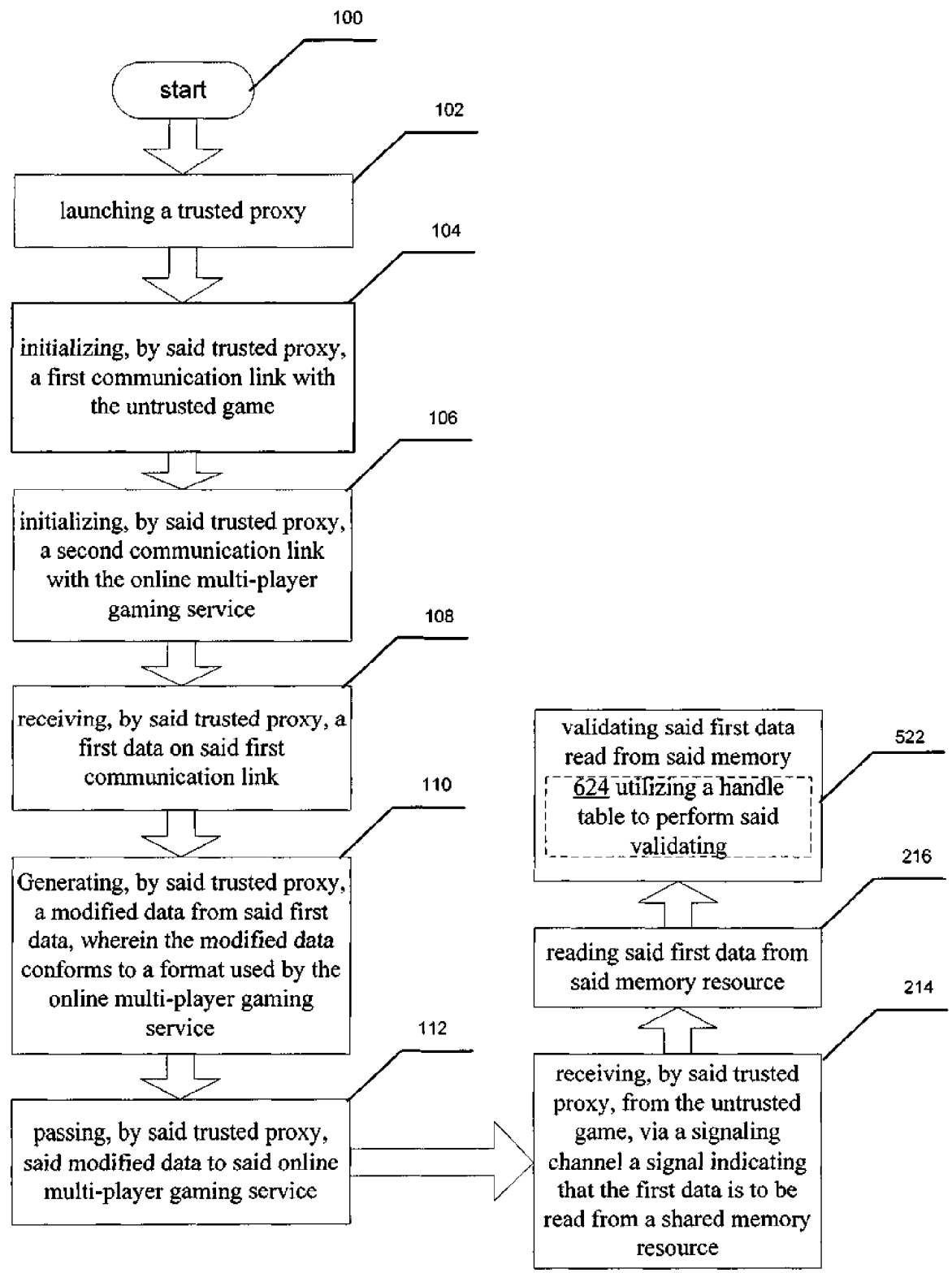
FIG. 6 illustrates an alternative embodiment of the example operational procedure of FIG. 5.
Figure 7:
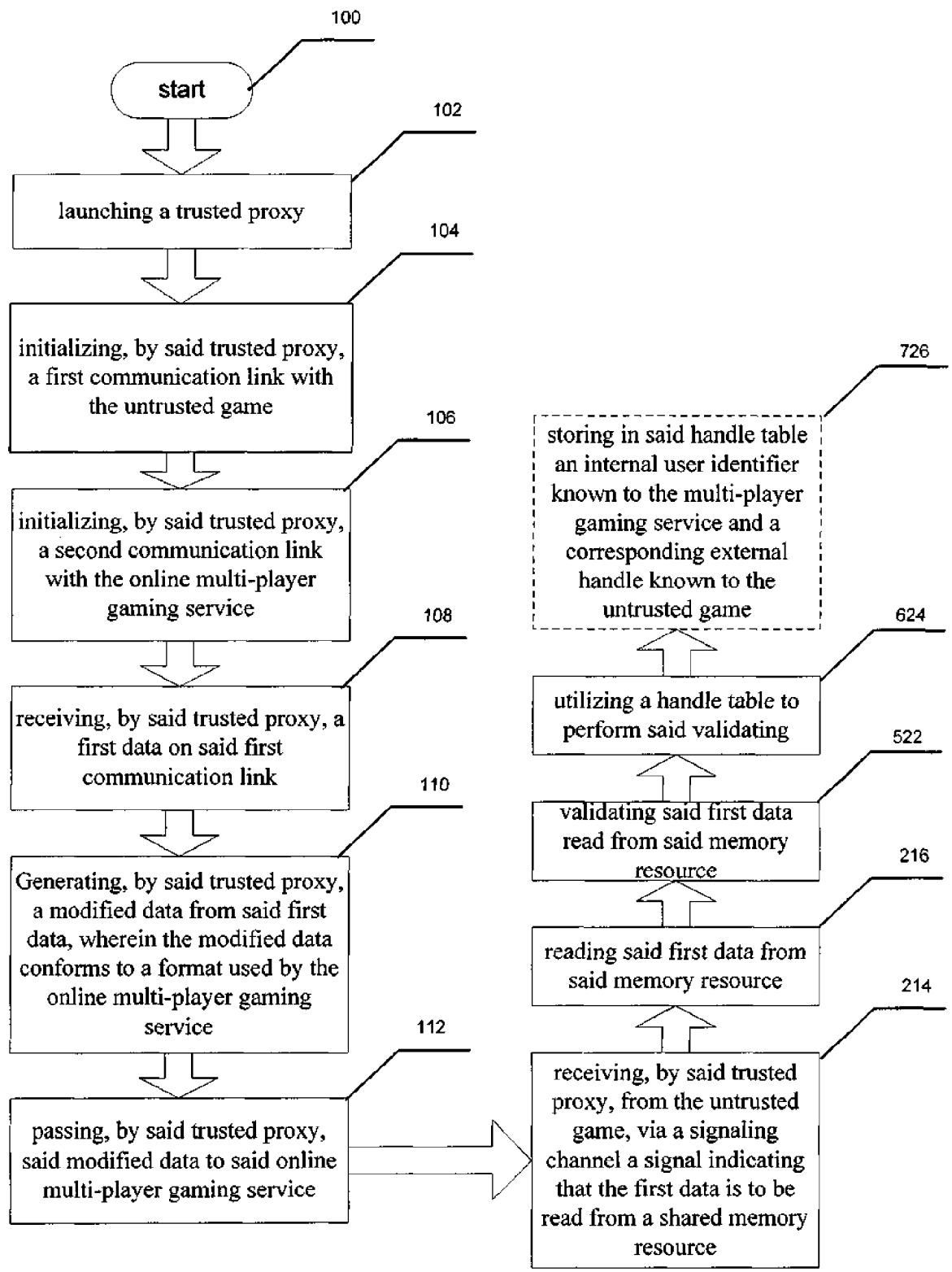
FIG. 7 illustrates an alternative embodiment of the example operational procedure of FIG. 6.

FIG. 6 illustrates an example of the operational procedure 100 of FIG. 5 that includes an additional operation 624 that illustrates validating said first data read from said memory resource including utilizing a handle table to perform said validating. In an embodiment of the present disclosure, the handle table may be, but is not limited to, allocated memory which, for each piece of data that is to be unavailable to an untrusted game, contains an entry for a handle that corresponds to an entry for that piece of data FIG. 7 illustrates an example of the operational procedure 100 of FIG. 6 that includes an additional operation 726 that illustrates utilizing a handle table to perform said validating including storing in said handle table an internal user identifier known to the multi-player gaming service and a corresponding external handle known to the untrusted game. In an embodiment of the present disclosure, this may be, but is not limited to, allocating and initializing space in random access memory in which to store this information. For example, the service may keep track of users according to distinct user identification strings. Where it would be sub-optimal to allow the untrusted game access to these strings, such as where the untrusted game could use the strings to perform unallowed operations, these strings could be stored in said handle table along with a corresponding integer external handle that would be passed to the untrusted game. The integer external handle would be such that the untrusted game would be unable to perform any unallowed operations using it.

Figure 8:
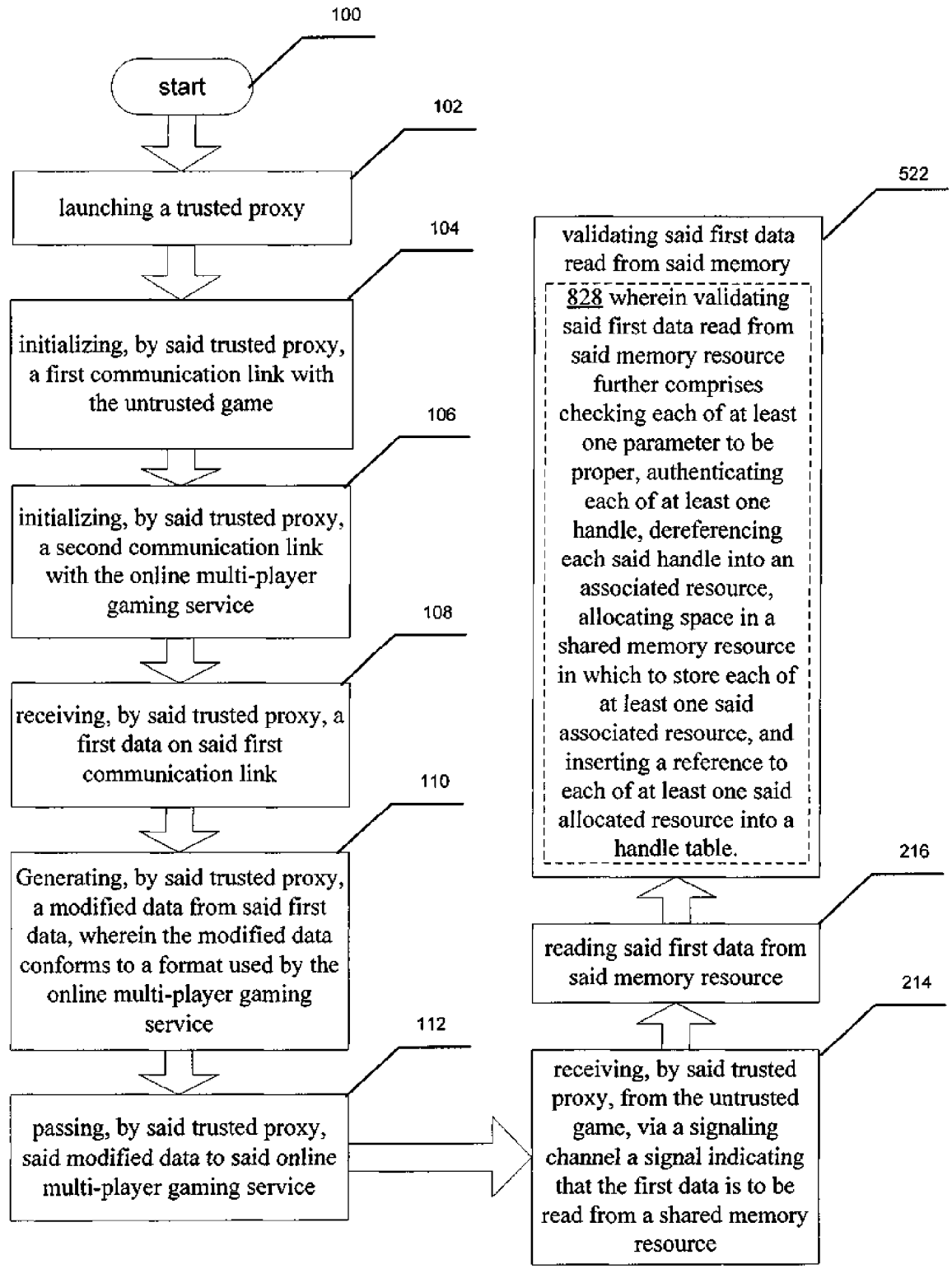
FIG. 8 illustrates an alternative embodiment of the example operational procedure of FIG. 5.

FIG. 8 illustrates an example of the operational procedure 100 of FIG. 5 including an alternative operation including 828. In this example, validating said first data read from said memory resource includes checking each of at least one parameter to be proper. In an embodiment of the present disclosure, this may be, but is not limited to, comparing each parameter against a list of acceptable values for that parameter and returning the result of whether the parameter is present within those acceptable values. Such parameters include, but are not limited to, the source address of the first data, the destination address of the data, a payload of the first data representing a sub-data to be operated on, a command to be executed, and a check-sum of the first data, which can be used to determine whether the first data has become malformed during transit.

Figure 9:
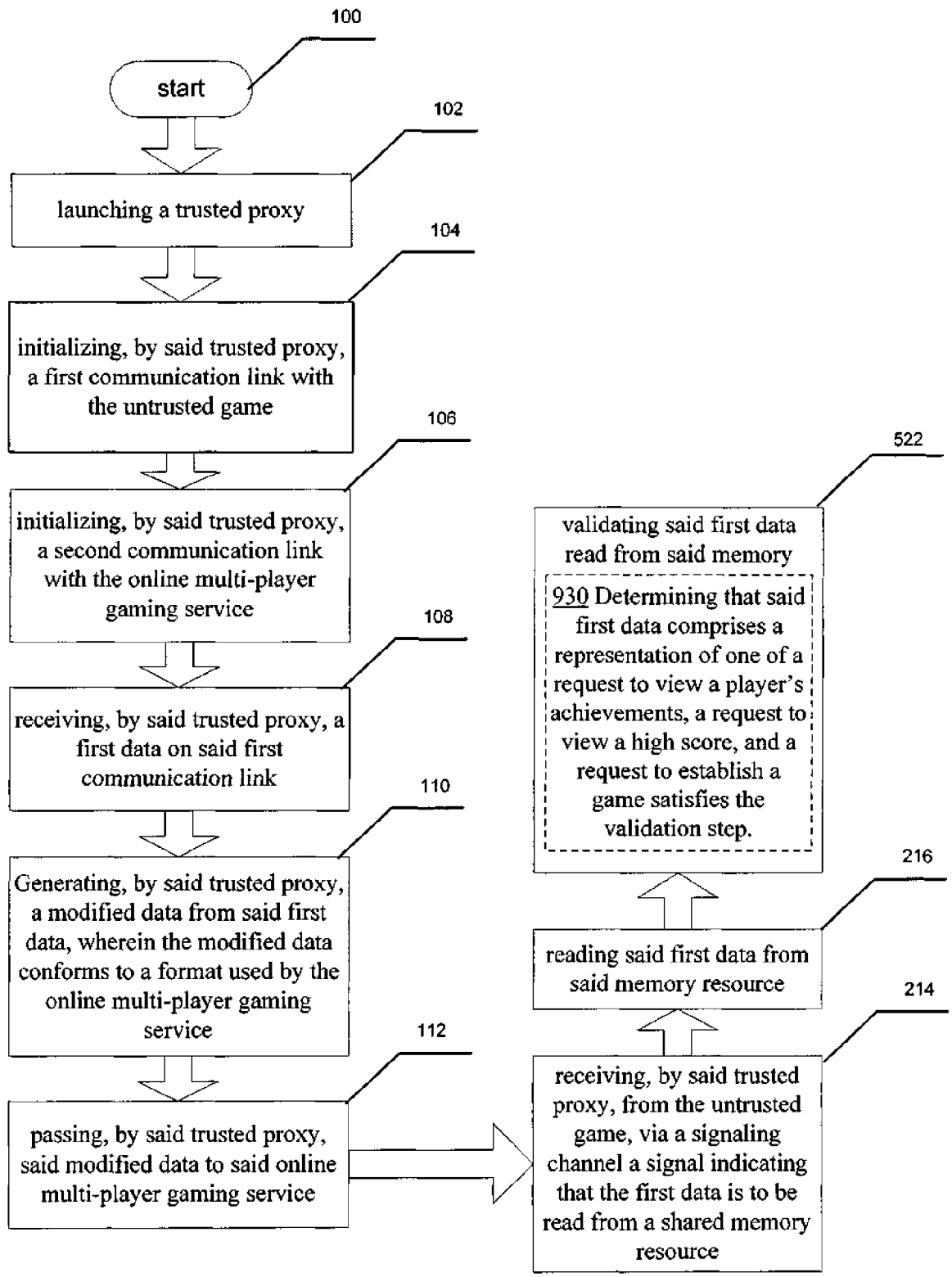
FIG. 9 illustrates an alternative embodiment of the example operational procedure of FIG. 5.

FIG. 9 illustrates an example of the operational procedure 100 of FIG. 5 including an alternative operation including 930. In this example, validating said first data read from said memory resource includes determining that said first data comprises a representation of one of a request to view a player's achievements, a request to view a high score, and a request to establish a game satisfies the validation step. In an embodiment of the present disclosure, this may be, but is not limited to, parsing said first data to isolate the field that signifies the type of request made, and comparing that value against a table that contains values corresponding to appropriate actions.

Figure 10:
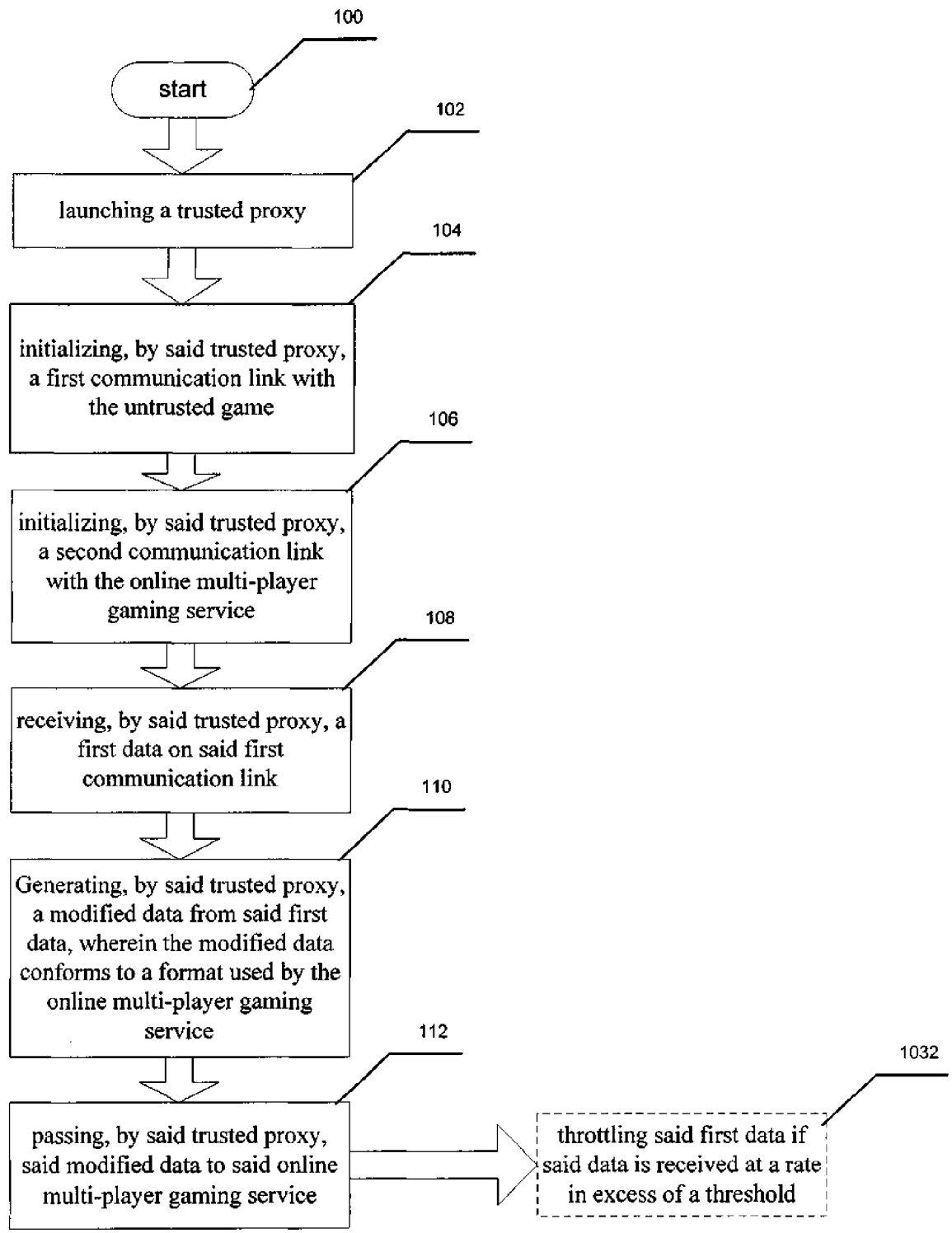
FIG. 10 illustrates an alternative embodiment of the example operational procedure of FIG. 1.

FIG. 10 illustrates an example of the operational procedure 100 that includes an additional operation 1032 that illustrates throttling said first data if said first data is received at a rate in excess of a threshold. In an embodiment of the present disclosure, this may be, but is not limited to, the trusted proxy not passing to the online multi-player gaming service all of said first data that is received by the trusted proxy at a rate in excess of the threshold. In this embodiment, throttling would protect the online multi-player gaming service from a denial of service attack caused by the untrusted game attempting to overload the service with data sent to it.

Figure 11:
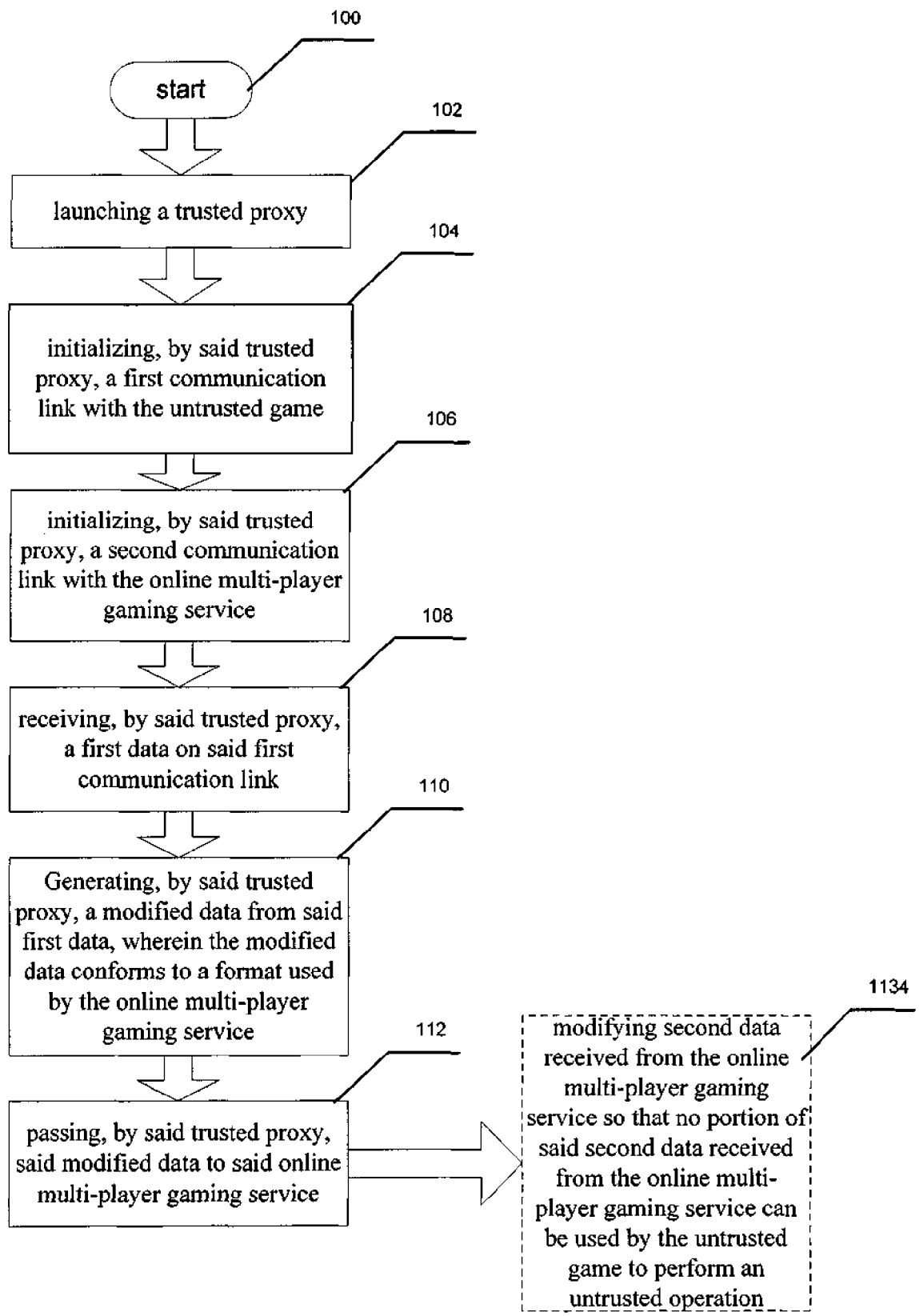
FIG. 11 illustrates an alternative embodiment of the example operational procedure of FIG. 1.

FIG. 11 illustrates an example of the operational procedure 100 that includes an additional operation 1032 that illustrates modifying second data received from the online multi-player gaming service so that no portion of said second data received from the online multi-player gaming service can be used by the untrusted game to perform an untrusted operation. In an embodiment of the present disclosure, this may be, but is not limited to, modifying the second data by replacing all information that the untrusted game is not permitted to possess with a surrogate handle, and storing the information/surrogate handle pairs in a data table that is accessible by the trusted proxy only.

Figure 12:
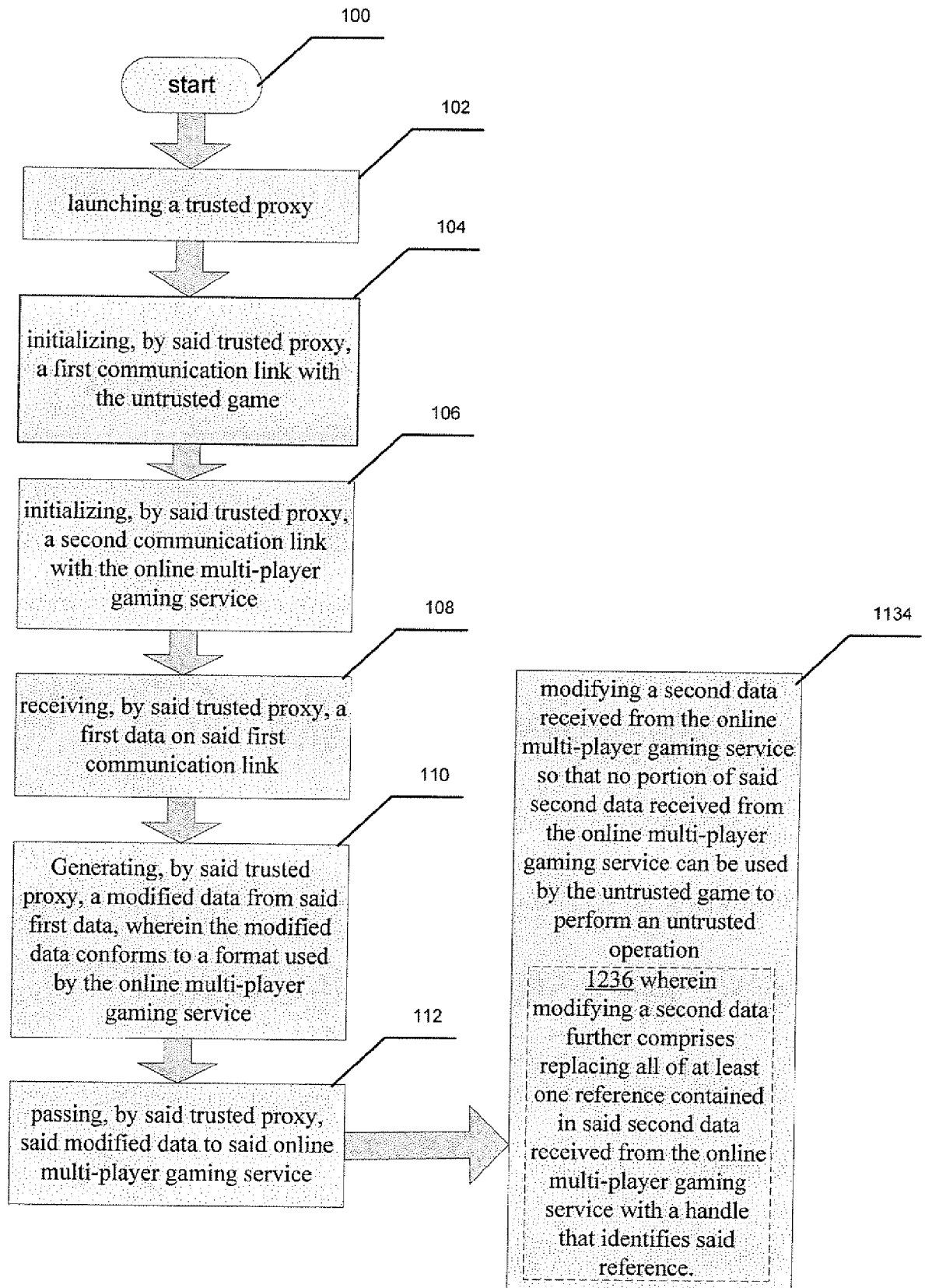
FIG. 12 illustrates an alternative embodiment of the example operational procedure of FIG. 11.

FIG. 12 illustrates an example of the operational procedure 100 of FIG. 11 including an alternative operation including 1236. In this example, modifying second data received from the online multi-player gaming service so that no portion of said second data received from the online multi-player gaming service can be used by the untrusted game to perform an untrusted operation includes replacing all of at least one reference contained in said second data received from the online multi-player gaming service with a handle that identifies said reference. In an embodiment of the present disclosure, this may be, but is not limited to, modifying the second data by replacing all information that the untrusted game is not permitted to possess with a surrogate handle, and storing the information/surrogate handle pairs in a data table that is accessible by the trusted proxy only.

Figure 13:
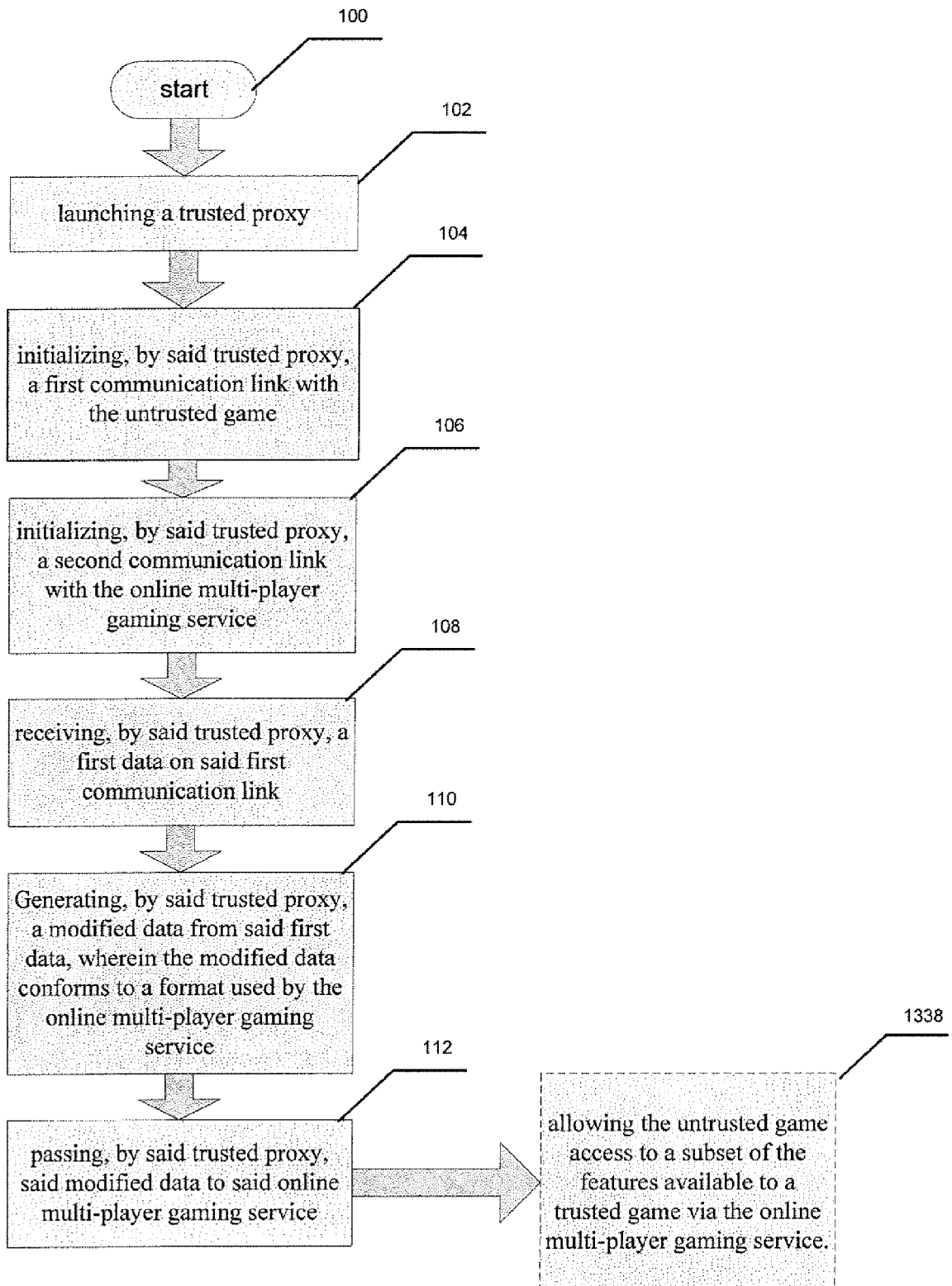
FIG. 13 illustrates an alternative embodiment of the example operational procedure of FIG. 1.

FIG. 13 illustrates an example of the operational procedure 100 that includes an additional operation 1338 that illustrates allowing the untrusted game access to a subset of the features available to a trusted game via the online multi-player gaming service. In an embodiment of the present disclosure, this may be, but is not limited to, storing, by the trusted proxy, a list of requests that the untrusted game is permitted to make, stored in a data table, and comparing all requests made by the untrusted game against said list. For example, the untrusted game may have access to such features as organizing, initializing and playing a multi-player game, communicating with other players, viewing high scores and viewing a list of which other players are currently playing the game. However, the untrusted game may not have access to special rankings boards that are allowed only for trusted games, so as to prevent cheating.

FIG. 14 illustrates an example of the operational procedure 100 including an alternative operation including 1440. In this example, initializing, by said trusted proxy, a first communication link with the untrusted game includes establishing, by said trusted proxy, with the online multi-player gaming service that the trusted proxy is trusted via a signature that the trusted proxy possesses. In an embodiment of the present disclosure, this may be, but is not limited to, appending said trusted proxy with a digital signature mechanism to verify the identity of the author or build system and a check-sum to verify that the object has not been modified. One skilled in the art would recognize that the above embodiments are examples and that other embodiments exist.

FIG. 15 illustrates various components of a system that may embody an operating environment for a computerized gaming system 1542 which allows an untrusted game to use an online multi-player gaming service that requires games to be trusted. The computerized gaming system 1542 itself comprises a processor 1544, a computer readable medium having a first stored instructions executable by said processor, said first instructions configured to cause said processor to exchange game information with an online multi-player gaming service 1546 and the computer readable medium having a second stored instructions further launching a trusted proxy configured to intercept first data transferred between the untrusted game and the online multi-player gaming service 1548. The computerized gaming system may establish a communication link 1554 with an untrusted game 1552. The computerized gaming system may also establish a second communication link 1556 with an online multi-player gaming service which requires games to be trusted 1550.

FIG. 16 illustrates an exemplary system for implementing aspects of the presently disclosed subject matter, including a general purpose computing device in the form of a computer 1641. Components of computer 1641 may include, but are not limited to, a processing unit 1659, a system memory 1622, a graphics processing unit 1629 (and a graphics interface 1631), a video memory 1630 (and a video interface 1632), and a system bus 1621 that couples various system components including the system memory 1622 to the processing unit 1659. The system bus 1621 may be any of several types of bus structures, including a memory bus or memory controller, a peripheral bus, and a local bus using any of a variety of bus architectures. By way of example and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 1641 typically includes a variety of computer-readable media. Computer-readable media can be any available media that can be accessed by computer 1641, and includes both volatile and nonvolatile media, removable and non-removable media. By way of example and not limitation, computer-readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, random access memory (RAM), read-only memory (ROM), electronically erasable programmable read-only memory (EE- PROM), flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1641.

Communication media typically embodies computer readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example and not limitation, communication media includes wired media such as a wired network or direct-wired connection, and wireless media such as acoustic, RF, infrared and other wireless media. Combinations of the any of the above should also be included within the scope of computer readable media.

The system memory 1622 includes computer storage media in the form of volatile and/or nonvolatile memory such as read only memory (ROM) 1623 and random access memory (RAM) 1660. A basic input/output system 1624 (BIOS), containing the basic routines that help to transfer information between elements within computer 1641, such as during start-up, is typically stored in ROM 1623. RAM 1660 typically contains data and/or program modules that are immediately accessible to and/or presently being operated on by processing unit 1659. By way of example and not limitation, FIG. 16 illustrates operating system 1625, application programs 1626, other program modules 1627, and program data 1628.

The computer 1641 may also include other removable/non-removable, volatile/nonvolatile computer storage media. By way of example only, FIG. 16 illustrates a hard disk drive 1638 that reads from or writes to non-removable, nonvolatile magnetic media, a magnetic disk drive 1639 that reads from or writes to a removable, nonvolatile magnetic disk 1654, and an optical disk drive 1640 that reads from or writes to a removable, nonvolatile optical disk 1653 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1638 is typically connected to the system bus 1621 through a non-removable memory interface such as interface 1634, and magnetic disk drive 1639 and optical disk drive 1640 are typically connected to the system bus 1621 by a removable memory interface, such as interface 1635.

The drives and their associated computer storage media discussed above and illustrated in FIG. 16 provide storage of computer readable instructions, data structures, program modules and other data for the computer 1641. In FIG. 16, for example, hard disk drive 1638 is illustrated as storing operating system 1658, application programs 1657, other program modules 1656, and program data 1655. Note that these components can be either the same as or different from operating system 1625, application programs 1626, other program modules 1627, and program data 1628. Operating system 1658, application programs 1657, other program modules 1656, and program data 1655 are given different numbers here to illustrate that, at a minimum, they are different copies. A user may enter commands and information into the computer 1641 through input devices such as a keyboard 1651 and pointing device 1652, commonly referred to as a mouse, trackball or touch pad. Other input devices (not shown) may include a microphone, joystick, game pad, satellite dish, scanner, or the like. These and other input devices are often connected to the processing unit 1659 through a user input interface 1636 that is coupled to the system bus, but may be connected by other interface and bus structures, such as a parallel port, game port or a universal serial bus (USB). A monitor 1642 or other type of display device is also connected to the system bus 1621 via an interface, such as a video interface 1632. In addition to the monitor, computers may also include other peripheral output devices such as speakers 1644 and printer 1643, which may be connected through an output peripheral interface 1633.

The computer 1641 may operate in a networked environment using logical connections to one or more remote computers, such as a remote computer 1646. The remote computer 1646 may be a personal computer, a server, a router, a network PC, a peer device or other common network node, and typically includes many or all of the elements described above relative to the computer 1641, although only a memory storage device 1647 has been illustrated in FIG. 16. The logical connections depicted in FIG. 16 include a local area network (LAN) 1645 and a wide area network (WAN) 1649, but may also include other networks. Such networking environments are commonplace in offices, enterprise-wide computer networks, intranets and the Internet.

When used in a LAN networking environment, the computer 1641 is connected to the LAN 1645 through a network interface or adapter 1637. When used in a WAN networking environment, the computer 1641 typically includes a modem 1650 or other means for establishing communications over the WAN 1649, such as the Internet. The modem 1650, which may be internal or external, may be connected to the system bus 1621 via the user input interface 1636, or other appropriate mechanism. In a networked environment, program modules depicted relative to the computer 1641, or portions thereof, may be stored in the remote memory storage device. By way of example and not limitation, FIG. 16 illustrates remote application programs 1648 as residing on memory device 1647. It will be appreciated that the network connections shown are exemplary and other means of establishing a communications link between the computers may be used.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an API, reusable controls, or the like. Such programs are preferably implemented in a high-level procedural or object oriented programming language to communicate with a computer system. However, the program(s) can be implemented in assembly or machine language, if desired. In any case, the language may be a compiled or interpreted language, and may be combined with hardware implementations.

The foregoing detailed description has set forth various embodiments of the systems and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

What is claimed:

1. A method for allowing an untrusted game to use an online multi-player gaming service that requires games to be trusted, comprising:
    launching a trusted proxy;
    initializing, by said trusted proxy, a first communication link with the untrusted game;
    initializing, by said trusted proxy, a second communication link with the online multi-player gaming service;
    receiving, by said trusted proxy, data comprising an indication of allocated memory for the untrusted game on the online multi-player gaming service;
    modifying, by said trusted proxy, the data by replacing the indication of allocated memory for the untrusted game with a handle that does not identify a portion of allocated memory for the untrusted game;
    sending, by the trusted proxy, an indication of the handle to the untrusted game;
    receiving, by the trusted proxy, an indication of an operation to perform with the handle;
    in response to receiving the indication of the operation to perform with the handle, sending, by the trusted proxy, an indication of the operation to perform with the indication of allocated memory;
    receiving, by said trusted proxy, a first data on said first communication link;
    generating, by said trusted proxy, modified data from said first data, wherein the modified data conforms to a format used by the online multi-player gaming service; and
    passing, by said trusted proxy, said modified data to said online multi-player gaming service.

2. The method of claim 1, wherein receiving, by said trusted proxy, a first data on said first communication link further comprises:
    receiving, by said trusted proxy, from the untrusted game, via a signaling channel a signal indicating that the first data is to be read from a shared memory resource; and
    reading said first data from said memory resource.

3. The method of claim 2, wherein reading said data from said memory resource further comprises:
    adhering to an inter-process communication (IPC) protocol.

4. The method of claim 2, further comprising:
    parsing said first data read from said memory resource.

5. The method of claim 2, further comprising:
    validating said first data read from said memory resource.

6. The method of claim 5, further comprising:
    utilizing a handle table to perform said validating.

7. The method of claim 6, further comprising:
    storing in said handle table an internal user identifier known to the multi-player gaming service and a corresponding external handle known to the untrusted game.

8. The method of claim 5, wherein validating said first data read from said memory resource further comprises:
    checking each of at least one parameter to be proper;
    authenticating each of at least one handle;
    dereferencing each said handle into an associated resource;
    allocating space in a shared memory resource in which to store each of at least one said associated resource; and
    inserting a reference to each of at least one said allocated resource into a handle table.

9. The method of claim 5, wherein validating said first data read from said memory resource further comprises:
    determining that said first data comprises a representation of one of a request to view a player's achievements, a request to view a high score, and a request to establish a game satisfies the validation step.

10. The method of claim 1, further comprising:
    throttling said first data if said first data is received at a rate in excess of a threshold.

11. The method of claim 1, further comprising:
    modifying second data received from the online multi-player gaming service so that no portion of said second data received from the online multi-player gaming service can be used by the untrusted game to perform an untrusted operation.

12. The method of claim 11, wherein modifying a second data further comprises:
    replacing all of at least one reference contained in said second data received from the online multi-player gaming service with a handle that identifies said reference.

13. The method of claim 1, further comprising:
    allowing the untrusted game access to a subset of the features available to a trusted game via the online multi-player gaming service.

14. The method of claim 1, wherein initializing, by said trusted proxy, a communication link with the online multi-player gaming service further comprises:
    establishing, by said trusted proxy, with the online multi-player gaming service that the trusted proxy is trusted via a signature that the trusted proxy possesses.

15. A computerized gaming system that allows an untrusted game to use an online multi-player gaming service that requires games to be trusted, comprising:
    a processor; and
    a memory communicatively coupled to the processor when the system is operational, the memory bearing computer-executable instructions that, when executed on the processor, cause the system to at least: launching a trusted proxy;
    initialize, by said trusted proxy, a first communication link with the untrusted game;
    initialize, by said trusted proxy, a second communication link with the online multi-player gaming service;
    receive, by said trusted proxy, data comprising an indication of allocated memory for the untrusted game on the online multi-player gaming service;
    modify, by said trusted proxy, the data by replacing the indication of allocated memory for the untrusted game with a handle that does not identify a portion of allocated memory for the untrusted game;
    send, by the trusted proxy, an indication of the handle to the untrusted game;

receive, by the trusted proxy, an indication of an operation to perform with the handle;

in response to receiving the indication of the operation to perform with the handle, send, by the trusted proxy, an indication of the operation to perform with the indication of allocated memory;

receive, by said trusted proxy, a first data on said first communication link; generate, by said trusted proxy, modified data from said first data, wherein the modified data conforms to a format used by the online multi-player gaming service; and pass, by said trusted proxy, said modified data to said online multi-player gaming service.

16. The computerized gaming system of claim 15, wherein the trusted proxy is further configured to make a fully-trusted call to the multi-player gaming service.

17. The computerized gaming system of claim 15, wherein the trusted proxy is further configured to allow the untrusted game to communicate with at least one other player using the online multi-user gaming service in real time.

18. The computerized gaming system of claim 15, wherein the memory further bears processor-executable instructions that, when executed on the processor, cause the system to at least:

parse, by the trusted proxy, data received from the untrusted game and dispatch said data received from the untrusted game to the online multi-user service.

19. A computer readable storage medium device having a plurality of computer executable instructions that when executed on a computer, cause the computer to perform operations comprising:

executing a trusted proxy process configured to coordinate data transferred between an untrusted process and an online multi-user service;

enabling a communication link with the untrusted process; enabling a communication link with the online multi-user service;

receiving, by said trusted proxy, data comprising an indication of allocated memory for the untrusted game on the online multi-player gaming service;

modifying, by said trusted proxy, the data by replacing the indication of allocated memory for the untrusted game with a handle that does not identify a portion of allocated memory for the untrusted game;

sending, by the trusted proxy, an indication of the handle to the untrusted game; receiving, by the trusted proxy, an indication of an operation to perform with the handle;

in response to receiving the indication of the operation to perform with the handle, sending, by the trusted proxy, an indication of the operation to perform with the indication of allocated memory;

receiving, from the untrusted process, via a signaling channel a signal indicating that said data is to be read from a shared memory resource;

reading said data from said memory resource; and sending said data to the online multi-user service.

20. The computer-readable storage device of claim 19, further having instructions that when executed on a computer, cause the computer to perform operations comprising:

parsing said data;

validating said data; and throttling said data if said data is received at a rate in excess of a threshold.

* * * * *